Jan. 19, 1965   I. L. JOY   3,166,731
ULTRASONIC TESTING DEVICE
Filed Nov. 24, 1959

Inventor
Ivan L. Joy.
By Mann, Brown and McWilliams,
Attys.

3,166,731
ULTRASONIC TESTING DEVICE
Ivan L. Joy, Topeka, Kans., assignor to Chemetron Corporation, Chicago, Ill., a corporation of Delaware
Filed Nov. 24, 1959, Ser. No. 855,150
3 Claims. (Cl. 340—15)

This invention is concerned with the application of ultrasonics to the inspection of bodies and, more particularly, is concerned with techniques for controlling the direction and time duration of beams of ultrasonic wave energy in the body being tested.

The invention finds particular application to the testing of solid bodies for determining the internal structural characteristics of such bodies. In the inspection of solid bodies with ultrasonics, arrangements have heretofore been devised for directng the ultrasonic search beams in angular directions through the body under test, and this has been accomplished by varying the angle of incidence of the beams approaching the body, with the angle of incidence being varied by physically redirecting the electromechanical transducer or other emitter that is supplying the beams or by making other types of mechanical adjustments in the relative positions of the parts.

The principal object of the present invention is to provide angular control for the ultrasonic beams without requiring mechanical adjustments of the position of the emitter.

Another object of the invention is to provide a plurality of closely spaced, parallel directed ultrasonic beams capable of merging in a pressure wave transmitting liquid or solid medium to define a single pressure front and having a time-spaced relation therebetween establishing the orientation and direction of advance of such pressure front in the medium.

Still another object of the invention is to provide for varying the time-spaced relationship between the mergeable beams for causing the pressure front to assume different orientation directions and, more specifically, to provide a variable time-spaced relationship for the beams such that the pressure front therefrom sweeps through successive angular positions for angularly scanning an entire region of the medium.

Another object of the invention is to provide an improved arrangement for eliminating ringing of the electromechanical transducer for generating ultrasonic beams of short duration.

Other objects and advantages will become apparent during the course of the following description.

In the accompanying drawings forming a part of this specification and in which like numerals are employed to designate like parts throughout the same:

Figure 1:
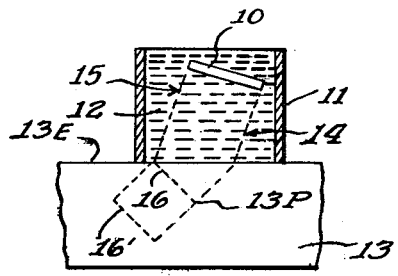
FIG. 1 is a diagrammatic side view, partly in section, illustrating the application of a conventional "angle" crystal to the testing of a solid body.

Referring now to the drawings and particularly to FIG. 1, a conventional "angle" crystal type of electromechanical transducer 10 is shown mounted in a holder 11 providing a liquid coupling column 12 (usually water) between the crystal and a solid body 13 to be tested. The body may be a block or casting of aluminum, steel, or other pressure wave transmitting material and may be of any configuration, as will be familiar to those skilled in this art. The crystal 10 emits high-frequency directional pressure waves or ultrasonic beams, and the ultrasonic beam energy emitted from the right-hand end of the crystal and following the travel path 14 arrives at the entering surface 13E of the test body before the beam energy emitted from the left-hand end of the crystal and following the travel path 15.

The beam following travel path 14 reaches the entering surface 13E prior to the beam following travel path 15. Assuming ultrasound travels faster in the solid body 13 than in the water column 12, at the time the beam on path 15 reaches the entering surface 13E, the beam path 14 will have travelled to the point 13P to establish a pressure front 16 within the body at an angle different from that of the angle of incidence of the pressure front travelling through the water column towards the body. Once established in the body, the pressure front travels in a direction normal to itself and at some later time, as indicated at 16', the pressure front in the body is parallel to its original orientation.

In accordance with the teachings of the present invention, it is important to recognize that ultrasonic waves are in fact pressure waves. Thus, they affect the immediately adjacent regions of the body in which they travel. Two pressure waves that are narrow and arranged in closely spaced, parallel relationship, if transmitting individual pressure waves slightly out of phase, will merge to create a single effective pressure front which then advances in a new direction determined by the timing or phasing relationship existing between the waves. This phenomenon occurs in liquids or solids and is a function of wave length relative to beam width and beam spacing.

Figure 2:
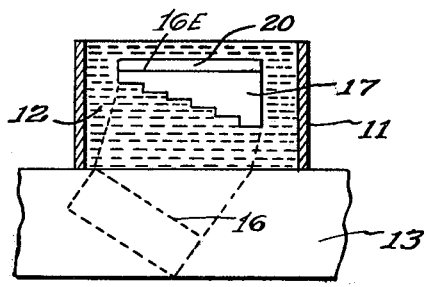
FIG. 2 is a diagrammatic side view, partly in section, illustrating an arrangement for producing an angular travel path for an ultrasonic beam from a "straight" crystal.

In FIG. 2, this phenomenon is employed for producing angle waves from a so-called "straight" crystal transducer 20 which is shown disposed in a holder 11 that provides a water column 12 for transmitting ultrasonic vibrations between the crystal and the body 13, with a stepped wedge 17 of aluminum or other material being interposed between the crystal and the body. The wedge has a flat entering face 16E and its stepped construction provides a plurality of closely spaced, parallel directed step faces which are here shown parallel to the entering face. In one experiment, each step face was selected to be ⅛" wide and a frequency of 3.3 megacycles was applied to the crystal to develop a wave length on the order of 0.0075" in water and 0.030" in a steel wedge. As will be apparent, the ultrasonic waves, upon passing through the separate delay line paths afforded by the different-thickness wedge steps, divide into closely spaced, parallel beams that are partially separated in time. The beam at the thick right-hand edge of the wedge has a higher velocity travel path than the beams to its left so that a pressure front 16 is formed which advances through the liquid in a direction angularly of the original direction of the crystal. This pressure front, upon passing through the water and entering the metal body, undergoes a further deflection in accordance with the velocity relationships of the ultrasound in the two materials. In the illustrated example the ultrasound travels faster in both the wedge and the solid body than in the liquid. Experiments with the stepped wedge show that both straight and angularly oriented pressure fronts are developed when the width of the beams is on the order of four times the wave length used. Other experiments show that where the width of the step faces is on the order of one wave length, only an angularly oriented pressure front is transmitted, with the straight pressure front being totally excluded.

In addition, beam spacing should be small as possible; the greater the beam spacing, the lower the angular efficiency and hence the more straight transmission.

The above experiments show that the narrower closely spaced beams create pressure front conditions wherein the adjacent pressure fronts culminate completely to form a single angularly directed pressure front. This suggests that control of the beam width in the direction of alignment of the adjacent beams provides a control over the type of pressure fronts existing in the medium. Thus, if desired, only an angularly advancing pressure front can be created by the use of closely spaced narrow beams or both angular and straight pressure fronts can be produced simultaneously with wider beams and/or wider beam spacing.

The thickness of the step faces is a function of the velocity of ultrasound in the wedge and in the liquid couplant. The relationships must be such that there is an overlapping in time of the pressure wave effects of adjacent beams such that the beams may merge or culminate in a pressure front of new orientation. In the usual application the time delay between adjacent beams may be only a fraction of a second, and this corresponds to a phase delay that would normally be less than 90°. This relationship is to be distinguished from the stepped block of Van Valkenburg et al. Patent No. 2,787,158, wherein adjacent beams are delayed from ten microseconds to perhaps one hundred microseconds and are non-overlapping in time to allow separate identification of each beam for use in a straight beam-scanning system. The non-overlapping relation of this Van Valkenburg et al. patent does not result in a culmination of pressure fronts of the individual beams such as would develop a composite pressure front moving in a new direction.

In a preferred embodiment of the principles of this invention, the plurality of closely spaced, parallel directed ultrasonic beams is produced from a plurality of crystal transducers 21 to 31 mounted for direct contact with the test body 13 and arranged in coplanar, closely spaced alignment and separately connected to successive points along an electrical delay line. A typical arrangement for use at 2.5 megacycles might employ crystals 0.060" wide, spaced apart on the order of 0.005" to 0.010". In the arrangement illustrated in FIG. 3, the delay line is shown with series-connected inductance elements 21L to 31L and parallel-connected capacitor elements 21C to 31C and is terminated in resistors 34 and 35 for preventing a back wave on the delay line. In the illustrated arrangement, each section of the delay line delays a signal 0.182 microsecond and the total delay of the line is two microseconds.

An actuating signal applied at point 50 at the input to the line arrives simultaneously at the points 51 and 52 in the test body 13 and, assuming a uniform delay line construction, signals corresponding to each of the intermediate crystals arrive simultaneously at points along the pressure front line 53. It will be assumed that the angular pressure front indicated at 53 advances to 54, where it strikes an internal discontinuity in the test body. It will also be assumed that the round-trip travel time between 53 and 54 is twenty microseconds.

Substantially at time $T=0$, the signal applied at point 50 is applied to crystal 21. Substantially at time $T=2$ microseconds, the applied signal reaches crystal 31, whereas the signal from crystal 21 has travelled ¼" to arrive at point 51 and establish the pressure front 53. The round trip from point 50 through crystal 21 to 54 and back is twenty-four microseconds, while the round trip through the delay line, crystal 31 to line 54 and back is also twenty-four microseconds. The reflected signals from all of the crystals return to the point 50 at the same time, and an indicator 40 for the ultrasonic system having one of its display channels connected to point 50 receives an indication free from echoes and other undesirable extraneous indications. An important advantage of the electrical delay line arrangement resides in the fact that it is quiet. In this connection, it should be noted with reference to FIG. 1 that in actual practice an echo is received from the entering surface 13E and it appears as a long surface indication that masks shallow defects or other discontinuities in the body under test.

Another interesting feature of the electrical delay line embodiment of the present invention is pointed up by the fact that if the actuating signal is applied at the point 60 at the other end of the line, the pressure front developed in the test body assumes an opposite angle from the normal. It will be apparent that a variety of pressure front orientations may be incorporated by varying the time delay of the various sections of the delay line.

Figures 4, 5:
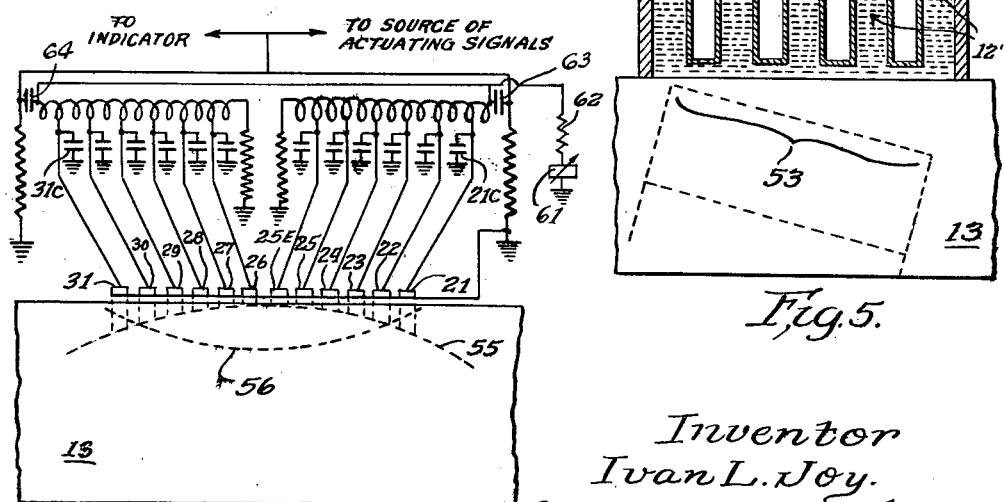
FIG. 4 is a fragmentary view illustrating a modified transducer connection arrangement for use with the ultrasonic system of FIG. 3.
FIG. 5 is a diagrammatic side view, partly in section, illustrating a multiple-column coupling liquid arrangement for use with the transducers shown in FIGS. 3 and 4.

For example, the capacitors 21C to 31C may be of the VARICAP type, which varies the capacity as the applied D.C. voltage is varied. A control arrangement of this type is shown as including a variable source of D.C. voltage 61 applied through a resistor 62 connected to one end of the delay line or, if desired, this D.C. control voltage may be applied to both ends of the delay line. Capacitors 63 and 64 isolate the D.C. from the rest of the system. Alternatively, a tuning slug arrangement may be used with the inductance elements for changing the delay line characteristics. With either of these techniques, the delay function of the delay line may be varied so that the effective angle of advance of the pressure front is correspondingly varied; and since these techniques permit of quickly varying the delay line function over a relatively wide range, the orientation of the pressure front may be progressively altered through a range of angles to permit angular scanning of a selected region of the test body. Very rapid scanning may be employed for displaying integrated results of various travel path angles through the test body.

Where the delay line has a non-uniform delay function, curved pressure fronts are created. One convenient arrangement for deriving a focusing effect is shown in FIG. 4, wherein the crystals 21 to 31 and an extra crystal 25E for balancing the sections are arranged in the form of a double delay line, the sections of which are electrically connected in parallel and at each end are provided with suitable resistors for preventing back waves. The focusing type of curved wave front is shown at 55. With VARICAP type condensers, the focal point can be varied up and down to scan a depth and the control elements 61, 62, 63, and 64 for this purpose are again shown in FIG. 4. By connecting the actuating signal to the opposite ends of the double delay line sections, a diverging or fanning pressure front may be produced, as indicated at 56 in FIG. 4.

Returning again to FIG. 3, it will be recalled that when the actuating signal is applied at point 50 and where each of the crystals is about four wave lengths wide, the aligned row of closely spaced ultrasonic beams which they produce culminate to form both an angularly advancing pressure front and also a straight forward pressure front. Assuming this condition exists, a separate channel of the indicator 40 may be connected to the point 60 for handling the reflections from the pressure front that advances straight. It will be apparent that the various beams which travel straight to a planar reflection surface will all arrive at the point 60 at the same time, and assuming a twenty-microsecond round-trip travel path in the body under test and a two-microsecond delay line, the timing of the signal at the indicator channel connected to point 60 is twenty-two microseconds.

Figure 3:
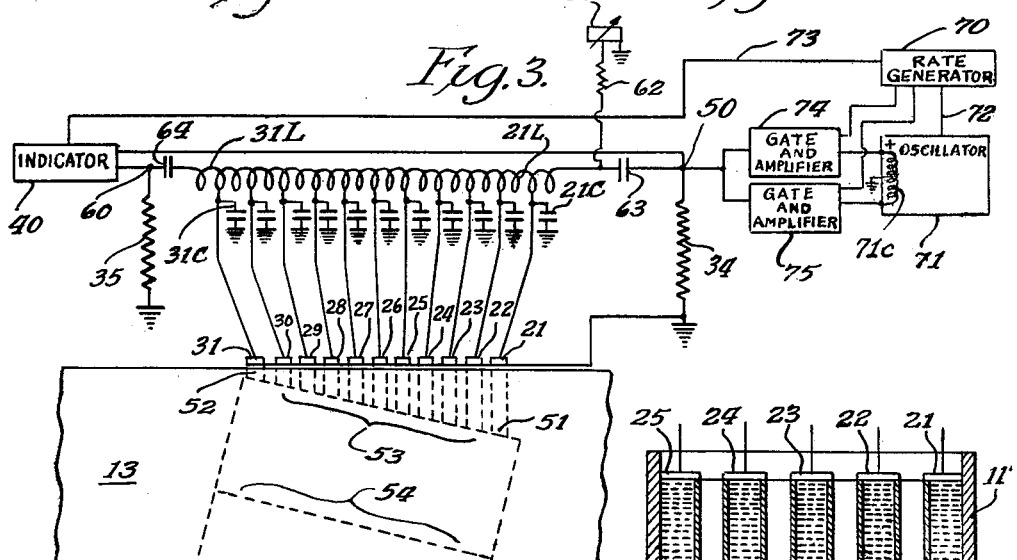
FIG. 3 is a composite diagrammatic illustration of a preferred ultrasonic testing system in accordance with the present invention.

In these various electrical delay-line connected multiple-crystal arrangements, it is advantageous to limit crystal ringing; and the ultrasonic system of FIG. 3 includes electronic facilities for accomplishing this. In the present system, a rate generator 70 triggers an oscillator 71 over line 72 and is connected to the indicator 40 over line 73 to initiate the indicator for synchronizing its sweep circuit, in the case of a cathode ray tube type of indicator, with the actuating signals from the oscillator. The oscillator feeds oppositely phased signals through two separate gate and amplifier sections 74 and 75, each of which is connected to the point 50. These gate sections are triggered by the rate generator to determine the time of application of the signals from the oscillator.

As illustrated, the oscillator 71 has a center-tapped output coil 71C wound and connected to the gate sections such that the signal passed through gate section 74 is 180° out of phase with the signal passed through gate section 75. Preferably, the signal from this oscillator is a pure sine wave at the frequency of resonance of the crystals.

In a preferred timing arrangement, the rate generator is set to start the oscillator about twenty microseconds before the first gate section 74 is to be fired. The oscillator is started early enough to allow time for it to generate a good sine wave, and this condition is important for optimum performance of the ultrasonic system. Assuming a typical system operating at 3.3 megacycles with crystals that are backed, the first gate section 74 may be turned on for about two microseconds to drive the crystal transducers with the pure sine wave output of the oscillator, and thereafter the second gate section 75 applies a signal of the same frequency but 180° out of phase to terminate crystal vibration substantially instantaneously. The amount of damping may be controlled by regulating either the pulse length or the pulse amplitude. Where unbacked crystals are used, the damping pulse might persist for ten microseconds. The timing of the wave trains from the two gate sections may be varied somewhat as desired since the illustrated arrangement always ensures proper phasing. Overlapping of the actuating and damping pulse is tolerable though best operation is realized when overlapping is a minimum. Efficient operation is assured with this arrangement since the crystals are driven with a pure sine wave at their resonant frequencies and without ringing.

It is desirable, wherever possible, that the aligned row of crystals used with the electrical delay line be mounted flush with the body being tested since the interposition of a liquid coupling line allows the beams to establish an angular pressure front in the liquid coupling line, as is indicated in FIG. 2; and this may, in certain circumstances, complicate the inspection problem. It will be apparent, however, that under controlled conditions the invention is fully workable with arrangements including unobstructed liquid coupling lines for transmitting vibrations between the transducer crystal and the test body.

In FIG. 5 there is shown a holder construction 11′ providing a plurality of closely spaced, isolated, parallel liquid columns 12′ extending between the crystal transducers 21 to 25 and the test body 13. This sectioned liquid coupling line arrangement maintains the beams isolated during most of their travel through the coupling liquid, and it is only after they enter the test body that they merge to form an angular pressure front such as is indicated at 53. In the illustrated holder construction, air chambers provided in hollow internal walls isolate the liquid columns 12′, and in instances where closer crystal spacing is required, mica dividers without air space can be employed for isolating the liquid columns. The relatively narrow liquid channels are advantageous wherever the application of the ultrasonic testing system requires continuous liquid flow for sweeping the liquid channels free of air bubbles entering at the bottom of the liquid columns. One such application exists in the progressive testing of rail by means of ultrasonic detector cars.

It should be noted that the holder construction of FIG. 5, wherein separate liquid channels are provided, may conveniently be modified to incorporate the stepped wedge 17 and single crystal 20 of FIG. 2 to adapt the stepped wedge principle for angular pressure-front generation in the body under test without involving the development of angular pressure fronts in the coupling liquid itself.

The foregoing description and the drawings are given merely to explain and illustrate the invention and the manner in which it may be performed, and the invention is not be be limited thereto, except insofar as the appended claims are so limited since those skilled in the art who have this disclosure before them will be able to make modifications and variations therein without departing from the scope and spirit of the invention.

I claim:
1. In ultrasonic test apparatus, means mounting a plurality of electromechanical transducers for emitting a plurality of closely spaced parallel directed beams of ultrasonic wave energy, an electrical delay line having a plurality of separate connection points connected individually to said transducers, generating means for producing first and second A.C. actuating signals for said transducers, said signals being of the same frequency and having a 180° phase displacement, and gate means for briefly applying the first signal and then the second signal to said delay line for actuating said transducers in time-spaced relation to provide a plurality of closely spaced parallel directed ultrasonic wave energy beams of short duration and having a time-spaced relation to form a pressure front.

2. In combination: an electromechanical transducer, an oscillator generating an actuating signal for said transducer, said signal having components of the same frequency and of opposite phase, a first gate circuit for applying one of said signal components to said transducer, a second gate circuit for applying the other of said signal components to said transducer, and means for briefly initiating the first gate circuit and then the second gate circuit.

3. In ultrasonic test apparatus for inspecting a solid body, means mounting a plurality of electromechanical transducers for emitting a plurality of closely spaced parallel directed beams of ultrasonic wave energy, means forming a plurality of closely spaced isolated parallel liquid columns extending straight between said transducers and said body, there being one such column for each transducer, an electrical delay line having a plurality of separate connection points connected individually to said transducers, and generating means for applying an electrical signal to said delay line for actuating said transducers in time-spaced relation to provide time spaced beams traveling straight through said columns to merge in said body and form a pressure front therein advancing in a direction angularly of the direction of said beams in said columns.

References Cited in the file of this patent
UNITED STATES PATENTS

| 1,971,688 | Lange | Aug. 28, 1934 |
| 2,651,012 | Van Valkenburg et al. | Sept. 1, 1953 |
| 2,786,193 | Rich | Mar. 19, 1957 |
| 2,968,808 | Russell | Jan. 17, 1961 |
| 3,090,030 | Schuck | May 14, 1963 |

FOREIGN PATENTS

| 736,464 | Great Britain | Sept. 7, 1955 |
| 751,154 | Great Britain | June 27, 1956 |
| 551,765 | Belgium | Oct. 31, 1956 |

OTHER REFERENCES

Article: "Improvements in Ultrasonic Flaw Detection," by G. Bradfield, B. Sc., from "Journal of the British Institution of Radio Engineers," July 1954, pages 303–308.

Article: "Ultrasonic Developments," from "Wireless World," September 1954, pages 448–450.